UNITED STATES PATENT OFFICE.

LORENZO P. TEED, OF ERIE, PENNSYLVANIA.

IMPROVEMENT IN ROOFING COMPOSITIONS.

Specification forming part of Letters Patent No. 169,385, dated November 2, 1875; application filed April 3, 1875.

*To all whom it may concern:*

Be it known that I, LORENZO P. TEED, of the city of Erie, county of Erie, State of Pennsylvania, have invented a new and Improved Roofing-Cement, to be used on old or new roofs, of which the following is a specification:

The nature of my invention consists in mixing slaked lime, sand, coal-tar, plumbago, and lamp-black, as hereinafter described.

I take a sufficient amount of coal-tar to mix the other ingredients in a semi-fluid state. I boil the coal-tar until all the water and gas are evaporated. Then take two parts of fresh-slaked lime, one part of fine-sifted sand, five pounds of lamp-black to one hundred pounds of cement, five pounds of plumbago to one hundred pounds of cement. I then put the sand and lime in a kettle and boil them perfectly dry; then add the hot coal-tar; then the lamp-black and plumbago, and mix them well together. It is to be applied to the roof while hot and spread with a hot iron.

What I claim as my invention is—

The manufacture or preparation of a compound roofing-cement in the proportions and mode of compounding described, for the purposes set forth.

LORENZO P. TEED.

Witnesses:
A. B. RICHMOND,
J. T. WHITE.